United States Patent [19]

Rott et al.

[11] Patent Number: 4,506,353

[45] Date of Patent: Mar. 19, 1985

[54] MEASURING APPARATUS FOR THE AUTOMATIC MEASUREMENT OF SPEED, TRAVELLED DISTANCE AND DIRECTIONAL CHANGES OF A MOVABLE BODY

[75] Inventors: Joachim Rott; Wolfgang Thelen; Bernd Hesselbrock, all of Berlin, Fed. Rep. of Germany

[73] Assignee: Krone GmbH, Berlin, Fed. Rep. of Germany

[21] Appl. No.: 382,917

[22] Filed: May 28, 1982

[30] Foreign Application Priority Data

Jun. 10, 1981 [DE] Fed. Rep. of Germany ....... 3122963

[51] Int. Cl.³ .............................................. G01S 15/60
[52] U.S. Cl. ..................................................... 367/91
[58] Field of Search ........................................... 367/91

[56] References Cited

U.S. PATENT DOCUMENTS 3,277,430  10/1966  Hagemann et al. .................... 367/91
3,745,520   7/1973  Barret et al. .......................... 367/91
3,893,076   7/1975  Clifford ................................ 367/91

FOREIGN PATENT DOCUMENTS 139772   10/1979  Japan ..................................... 367/91
197712   12/1977  Netherlands .......................... 367/91
2059215   4/1981  United Kingdom .

Primary Examiner—Richard A. Farley
Attorney, Agent, or Firm—Baker, Maxham, Callan & Jester

[57] ABSTRACT

The measuring apparatus is intended for the automatic measurement of speed, travelled distance and directional changes, wherein two measuring units (3, 3a) are disposed in spaced relationship on the underside (4) of a vehicle (5). Upon a comparison of the left-hand and the right-hand signal a measurement of the directional change is effected, wherein each measuring unit (3, 3a) respectively comprises a forwardly and a backwardly measuring and transmitting measuring section (I and II, respectively); thereby errors of measurement caused by pitching motions of the vehicle may be minimized to less than 0.1%.

7 Claims, 3 Drawing Figures

MEASURING APPARATUS FOR THE AUTOMATIC MEASUREMENT OF SPEED, TRAVELLED DISTANCE AND DIRECTIONAL CHANGES OF A MOVABLE BODY

The invention relates to a measuring apparatus for the automatic measurement of speed, travelled distance, and directional changes of movable bodies by means of detected ultrasonic wave Doppler shifts.

In the case of farm vehicles the conventional method for measuring the speed and the travelled distance by measurement of the wheel revolutions and multiplication thereof by the wheel circumference is extremely defective due to wheel slip, lateral deviations caused by sliding motions, and different tire pressures, so that an automatic guiding of such vehicles appears to be impossible.

Thus, systems have already been known in which a position fixing of farm vehicles is performed by means of radio waves emitted by stationary transmitters, by means of light sources conducting light via stationary mirrors, or by means of induction loops disposed in the field. Furthermore, there is an optical system which enables an indication of the speed and the travelled distance of the respective vehicle from the correlation of random-distributed brightness values at a section of the ground and the shifting thereof with time.

Such apparatus for automatically guiding farm vehicles in the field are, however, liable to the drawback that a reference system which is stationary in the field is required, thus resulting in relatively high expenditure.

It is therefore the object of the present invention to provide a measuring apparatus which, while avoiding a field-stationary reference system, enables the exact derivation of certain measured values for the automatic guiding of farm vehicles.

In accordance with the present invention this object is attained in that two measuring units are disposed on the underside of a vehicle at a spacing substantially equal to the vehicle width, said measuring units consisting of a measuring section effecting measurements in and/or opposite to the direction of travel and including a transmitter and a receiver, wherein the transmitters are disposed such that the ultrasonic beams transmitted at an angle are reflected from the ground and are received by the receivers, and wherein the Doppler shift of the received signals indicates the speed and the distance travelled, and the difference between the left-hand and the right-hand measured values from the measuring units relating to the travelled distance indicates the directional deviation of the vehicle relative to the ground.

In accordance with the present invention information relating to the speed is obtained after the transmission, reflection from the ground, and receipt of an ultrasonic signal. By mathematical integration with time the distance travelled is obtained. When the distance on the left-hand and the right-hand side of the vehicles is separately determined, the difference is an indication of the angular variation of the vehicle longitudinal axis within the integration time.

It is therefore possible with this novel measuring apparatus to obtain three essential advantages which are decisive for the invention:

(a) Due to the provision of a left-hand and a right-hand measuring unit a directional deviation of the vehicle along a path is prevented by a correction based on a comparison of the two obtained distance signals.

(b) Each measuring unit comprises a forward and a backward measuring section, whereby the error of measurement caused by pitching motions of the vehicle is minimized to substantially less than 0.1%. In this connection the influence of hysteresis and wheel slip is of no significance.

(c) No stationary unit is required for the solution of the above-specified object.

Advantageous further embodiments of the invention are characterized in the subclaims.

The invention will be explained below with reference to an embodiment thereof shown in the drawing, in which.

Figure 1:
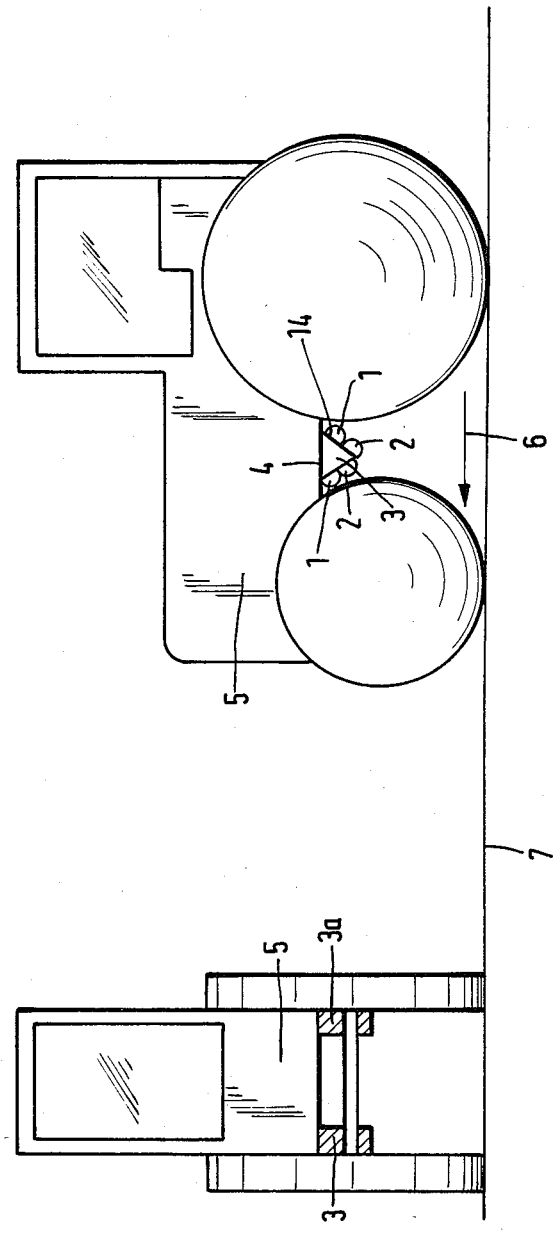
FIG. 1 shows a vehicle including a measuring apparatus in accordance with the present invention, in which the measuring heads receive and transmit both in and opposite to the direction of travel.

In accordance with FIG. 1 the invention provides two measuring units 3, 3a each comprising a transmitter 1 and a receiver 2. The transmitter 1 radiates its ultrasonic signal at an angle ($\alpha$) in and/or opposite to the travelling direction shown by arrow 6 (see FIG. 3). The longitudinal axis of the vehicle is always parallel to or in the direction of travel at any instant in time. The transmitted beams are parallel to a vertical plane through the longitudinal axis. The signal, which is reflected from an unevenness in the ground, is received by the receiver 2.

Figure 2:
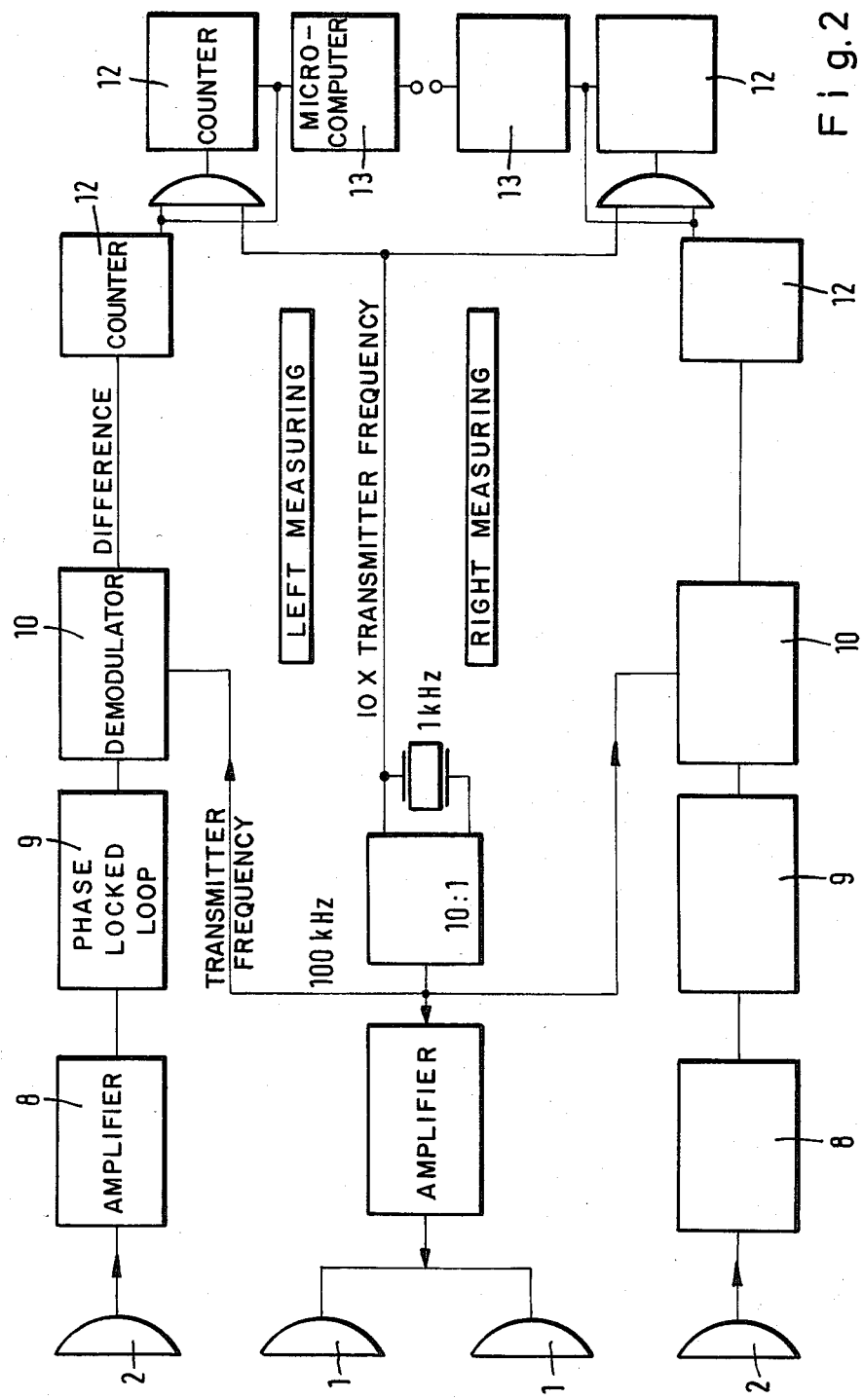
FIG. 2 shows an electronic circuit diagram of the measuring apparatus in accordance with the invention as shown in FIG. 1.

As shown in FIG. 2, the output from the receiver 2 is regularly amplified in an output-connected amplifier 8 to a level sufficient for triggering a phase-locked loop (PLL) 9. The PLL 9 will follow a variation of the input signal only sluggishly, so that Doppler shifts of the input signal caused by abrupt motions of the vehicle 5 will not result in any substantial change of the output frequency of the PLL 9. However, any changes of the output frequency of the PLL 9 caused by changes of the vehicle speed will be transferred to the output signal after a few tenths of a second. To the output of the PLL 9 there is connected a demodulator 10 which during measurement in travelling direction subtracts the transmitter frequency from the Doppler frequency and delivers the result as a differential signal. This differential signal has a frequency which has an exact mathematical relationship to the speed of the vehicle 5.

The differential signal is supplied to a digital counter 12 which after a predetermined number of pulses, when the count is zero, produces an output pulse, thereby preventing loss of information caused by the occurrence of counting errors. This time interval is supplied to a microcomputer 13. Within the microcomputer 13 the measured frequency will be converted to speed and the frequency will be converted to time and distance. From the differential frequency and from the transmitter frequency, which is supplied as an input signal, the microcomputer 13 determines the speed. By a mathematical integration of the speed with time, i.e., by counting of the differential frequency, the distance travelled by the respective vehicle 5 will result. As the vehicle 5 travels predominantly over uneven ground 7, the angle of the reflected beam will vary about a mean value, which causes a variation of the length of the measuring beam. In the case of equally large fluctuations about the mean value this will result in an error in the determination of speed and distance. For this reason both the left-hand and the right-hand measuring unit 3, 3a each comprise a respective forward-measuring section I and a respective backward-measuring section II, one of said measuring sections determining the transmitter frequency + the differential frequency, and the other one determining the transmitter frequency − the differential frequency.

Figure 3:
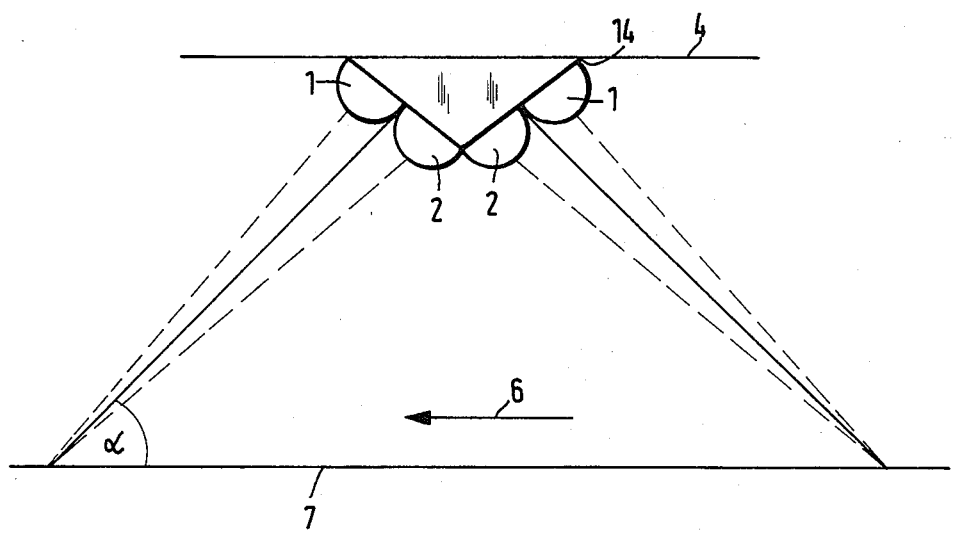
FIG. 3 shows schematically the forwardly and rearwardly directed measuring elements in accordance with the invention.

As shown in FIG. 3, both measuring sections I and II are mounted on a common angled base plate 14 on a forwardly and, respectively, a backwardly directed leg thereof. By the provision of means permitting a comparison of the two Doppler signals of the forward- and the backward-measuring sections it it possible within the scope of the present invention to reduce the error in measurement to a value which is substantially less than 0.1%. The angled base plate 14 is mounted on a transverse vehicle axle, and shock absorbing elements are provided for absorbing rocking motions. Error corrections derived from the comparison of the measured values from the measuring sections I and II are supplied to the microcomputer 13. If the measuring beam length varies because of a vertical deflection of the vehicle 5, a temporary error will occur in the measuring signal which, however, will again become zero during the return motion.

For the measurement of directional deviations the invention provides two measuring units 3, 3a at a predetermined spacing relative to each other. The simultaneously obtained distance signals result in a measured value for the directional deviation of the vehicle 5 along its path of travel.

We claim:

1. Measuring apparatus for automatic measurement of speed, distance travelled and directional changes of a moving vehicle traveling over the ground by means of ultrasonic wave Doppler shifts, said apparatus comprising:
    a first measuring unit mounted on the vehicle adjacent one side thereof and directed generally downwardly toward the ground;
    a second measuring unit laterally spaced from said first measuring unit and mounted on the vehicle adjacent the opposite side thereof and directed generally downwardly toward the ground;
    a first transmitter in said first measuring unit;
    a first receiver in said first measuring unit;
    a second transmitter in said second measuring unit;
    a second receiver in said second measuring unit;
    said first and second transmitters being arranged with respect to the vehicle to transmit the ultrasonic beams to the ground parallel to a vertical plane through the longitudinal axis of the vehicle and at an angle of 90° − α with respect to the vertical, said transmitted beams being reflected from the ground and received by said first and second receivers, the Doppler shift of the received signals providing indications of the speed of and distance travelled by the vehicle; and
    means for determining the difference of the measured speed and distance values between said first and second measuring units thereby indicating the directional deviation of the vehicle relative to the ground.

2. The measuring apparatus recited in claim 8 and further comprising:
    a third transmitter in said first measuring unit;
    a third receiver in said first measuring unit;
    a fourth transmitter is said second measuring unit;
    a fourth receiver in said second measuring unit;
    said first transmitter/receiver pair in said first measuring unit being oriented to send and receive ultrasonic beams generally forwardly parallel to the vertical plane through the longitudinal axis of the vehicle;
    said third transmitter/receiver pair in said first measuring unit being oriented to send and receive ultrasonic beams generally rearwardly parallel to the vertical plane through the longitudinal axis of the vehicle;
    said second transmitter/receiver pair in said second measuring unit being oriented to send and receive ultrasonic beams generally forwardly parallel to the vertical plane through the longitudinal axis of the vehicle; and
    said fourth transmitter/receiver pair in said second measuring unit being oriented to send and receive ultrasonic beams generally rearwardly parallel to the vertical plane through the longitudinal axis of the vehicle;
    wherein the received signals are compared, such comparison enabling substantial minimization of the measurement error.

3. The measuring apparatus recited in either claim 1 or 2, said apparatus further comprising:
    amplifiers to amplify the signals from each of said receivers; and
    phase locked loops connected to respective amplifier outputs for regeneration, said phase locked loops being so configured that signal drop-outs occurring at said receivers may be bridged during a time interval which is small relative to the time constant of the vehicle.

4. The measuring apparatus recited in claim 3, said apparatus further comprising demodulators respectively connected to the outputs of said phase locked loops, the output frequencies of said demodulators correspond to the difference between the transmitter frequencies and the receiver Doppler frequencies.

5. The measuring apparatus recited in claim 4, and further comprising digital counters to which the outputs of said phase locked loops are respectively coupled, whereby after a predetermined number of pulses, when the count is zero, said counters supply respective output pulses.

6. The measuring apparatus recited in claim 5, and further comprising microcomputer means, the output pulses from said digital counters being connected to said microcomputer means whereby, in response to the time interval between two output pulses and predetermined set values, said microcomputer means supplies corresponding correcting values which react on a control system on the vehicle.

7. The measuring apparatus recited in claim 2, and further comprising first and second common angled base plates, one of said base plates being mounted to each side of the vehicle, wherein said first and third transmitter/receiver pairs are mounted on one of said angled base plates and said second and fourth transmitter/receiver pairs are mounted on the other of said base plates.

* * * * *